Nov. 6, 1962  F. A. SUMMERLIN ETAL  3,062,993
SELSYN WOUND TO ELIMINATE HARMONICS
Filed Aug. 16, 1960  2 Sheets-Sheet 1

INVENTORS
FREDERICK A. SUMMERLIN
DAVID H. ROBERTS
BY

ATTORNEY

INVENTORS
FREDERICK A. SUMMERLIN
DAVID H. ROBERTS
BY

ATTORNEY

United States Patent Office 3,062,993
Patented Nov. 6, 1962

3,062,993
SELSYN WOUND TO ELIMINATE HARMONICS
Frederick Arthur Summerlin, Isleworth, and David Harri Roberts, Southall, England, assignors to The Sperry Gyroscope Company Limited, Middlesex, England, a company of Great Britain
Filed Aug. 16, 1960, Ser. No. 66,391
Claims priority, application Great Britain Aug. 21, 1959
4 Claims. (Cl. 318—24)

This invention relates to electromagnetic devices and seeks to provide an improved form thereof.

In accordance with the invention there is provided an electromagnetic device comprising a stator having within it a relatively rotatable rotor presenting to the stator two poles of unequal angular extent.

The invention also provides an electromagnetic device comprising a stator having within it a relatively rotatable rotor, the relative rotational positions of the rotor and stator being adapted to be related to an electric signal in a winding of the device, said rotor presenting to the stator two poles of unequal angular extent.

Further, the invention provides an electromagnetic device comprising a stator having within it a relatively rotatable rotor and adapted to produce an electric signal between output terminals which is related to the relative positions of the rotor and stator, the rotor of said device presenting to the stator two poles of unequal angular extent whereby the harmonic content of said electric signal is reduced compared with the content present when said poles have approximately equal angular extents.

Figure 1:
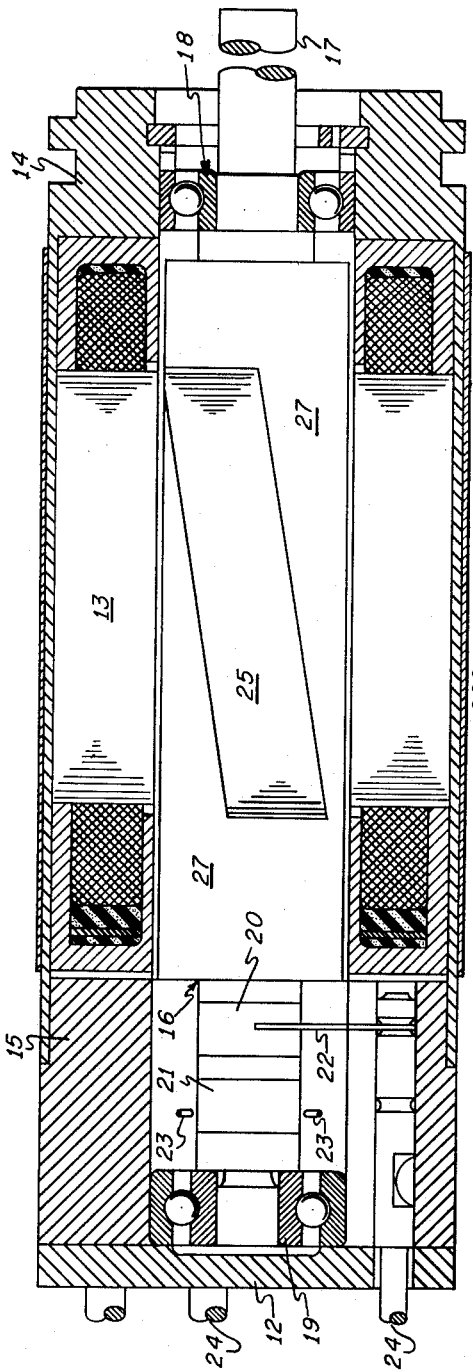
Figure 2:
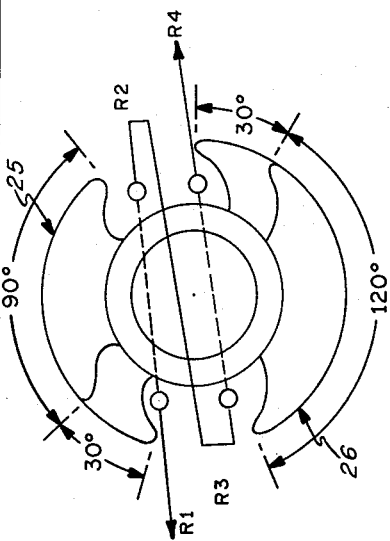
Figure 3A:
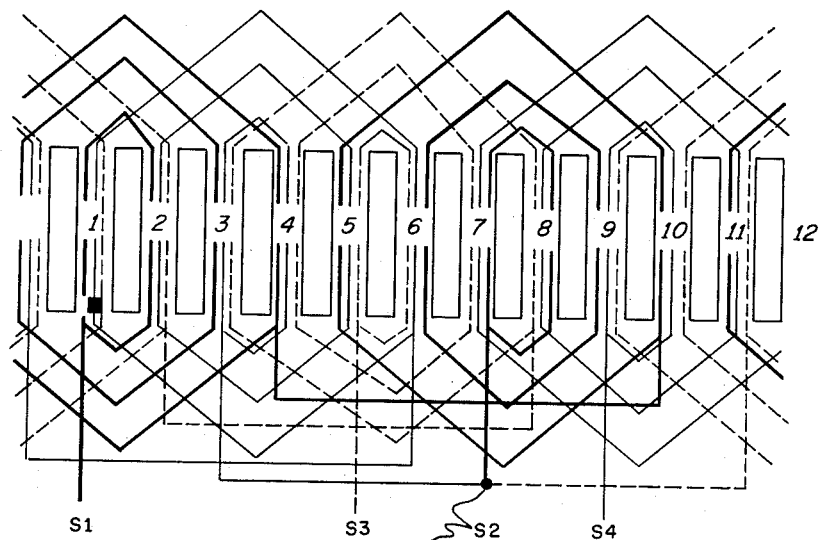
Figure 3B:
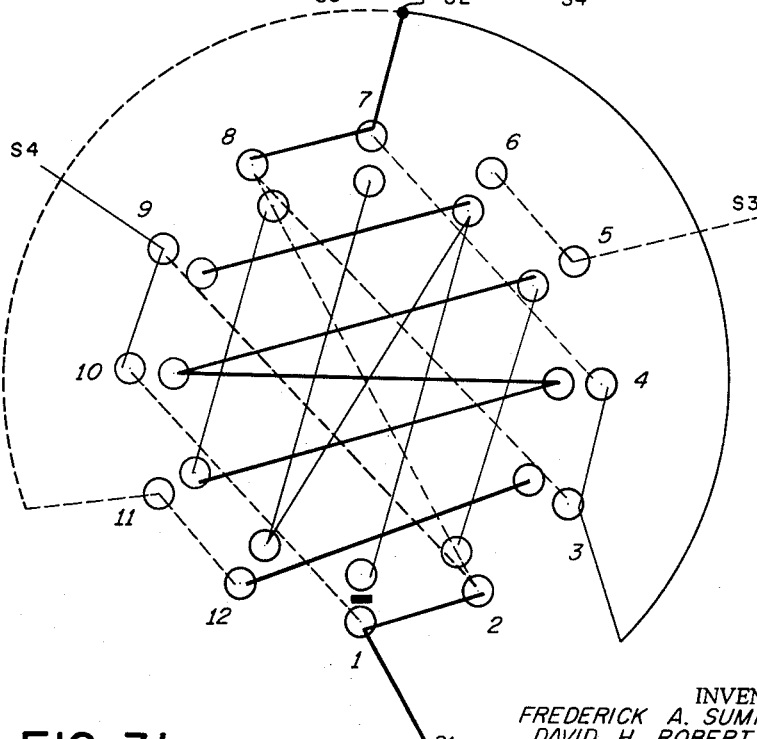

In order that the invention may be more readily understood one particular embodiment thereof will now be described by way of example only with reference to the accompanying drawings in which:

FIGURE 1 is a longitudinal cross sectional view of an electromagnetic device in accordance with the present invention, FIGURE 2 is an end elevation of the rotor of the device shown in FIGURE 1, FIGURE 3a is a schematic winding diagram in plan development view for the stator of the device shown in FIGURE 1, and FIGURE 3b is a schematic winding diagram in end elevation view for the stator of the device shown in FIGURE 1.

In an angular-position responsive device such as, for example, a selsyn transmitter or receiver, the electric signal in the signal winding or windings may contain harmonics of the signal frequency. The presence of these harmonics introduces errors into apparatus in which the position responsive device may be used which results in the inaccurate representation of angular position by the electric signal and conversely. Some harmonics may be removed by the arrangements of the windings in the device. For example, even harmonics may be minimised by arranging the windings to be symmetrical about their axes, and odd harmonics which are a multiple of three may be minimised in three-phase position responsive devices by arranging the various windings of each phase to be symmetrical with respect to those of the other phases. Other harmonics, which form a substantial proportion of the harmonics in a device where the even and three times harmonics have been minimised, cannot be minimised since the procedures for minimising them would result in reduction or cancellation of the fundamental frequency of the signal in the signal winding or windings. Such other harmonics are in particular those which are $(n-1)$ and $(n+1)$ times the fundamental where $n$ is the number of slots in the stator of the device.

By means of the poles of the rotor having unequal angular extents as provided by the invention these harmonics may be minimised without a serious reduction in the fundamental frequency of the signal in the signal winding or windings. The optimum angular extent of the poles of the rotor in the arrangement shown in the drawing could be determined from the simultaneous equations:

$$\frac{1}{(n-1)}\left(\frac{\sin (n-1)\alpha}{\alpha}+\frac{\sin (n-1)\beta}{\beta}\right)=0 \quad (1)$$

$$\frac{1}{(n+1)}\left(\frac{\sin (n+1)\alpha}{\alpha}+\frac{\sin (n+1)\beta}{\beta}\right)=0 \quad (2)$$

where $2\alpha$=angular extent in degrees of one pole,
$2\beta$=angular extent in degrees of other pole, and
$n$=number of slots in stator of the device.

However there is no solution to these equations, but it can be shown their solutions are closely in agreement over a few degrees of pole extent, and if the angles are chosen within this range, a substantial reduction in the amplitude of the $(n-1)$ and $(n+1)$ harmonics can be achieved. The improvement amounts to a reduction to approximately 10 percent of their original amplitude.

In the arrangement shown in the drawings the stator 13 is provided with twelve slots designated 1 to 12 in which three star connected windings S1—S2, S3—S2 and S4—S2 are wound. The winding arrangement of these windings is shown in detail in the schematic winding diagrams of FIGURES 3a and 3b.

The stator 13 is housed in a two-part housing 14—15 and has arranged within it a rotor 16. The rotor 16 is supported by means of a shaft 17 journalled in two bearings 18, 19. The rotor 16 carries an energising winding formed of two serially connected coils R1, R2 and R3, R4. This energising winding is adapted to be connected to a source of alternating energising current through slip rings 20, 21 and brushes 22, 23 from which conductors 24 extend through the end cover 12 of the housing. The rotor is formed to present to the stator two poles 25, 26. The angular extent of the pole 25 is approximately 90° and the angular extent of the pole 26 is approximately 120°. The extent of the pole 25 corresponds approximately to an even number of the slots 1 to 12, while that of the pole 26 corresponds approximately to an odd number of said slots.

In a selsyn transmitter embodiment of the present invention having an alternating signal energized winding on a two pole rotor and three star connected stator windings, the amplitudes of the output signals induced in the stator windings are proportional to the angular position of the rotor with respect to the stator. In operation, the two rotor poles of unequal arcuate extent effect a significant reduction of the $(n-1)$ and $(n+1)$ harmonics of the excitation signal appearing in the stator windings. To the extent that said harmonics are reduced in the stator windings, the amplitudes of the stator signals more accurately represent the angular position of the rotor with respect to the stator. As previously mentioned, it has been found that the amplitude of the unwanted $(n-1)$ and $(n+1)$ harmonics may be reduced to approximately 10 percent of their original amplitude when the angular extent of the rotor poles are determined in accordance with the foregoing simultaneous Equations 1 and 2.

The rotor 16 is formed of a magnetically permeable part consisting of a plurality of laminations of magnetisable material stacked together. If desired, however, it may be formed of sintered material shaped, as for example by casting, in the desired form. A body of synthetic resin insulating material 27 is associated with the laminations so that the rotor presents an approximately cylindrical outer surface. The material 27 serves both to protect the windings R1, R2 and R3, R4 on the rotor from damage and to maintain them in a fixed position relative to the laminations.

What is claimed is:
1. An electromagnetic device comprising a slotted stator having within it a relatively rotatable rotor, the relative rotational positions of the rotor and stator being adapted to be related to an electrical signal in a winding of the device, said rotor presenting to said stator two poles of unequal angular extent wherein the angular extents of the rotor poles are equal to those angles which approximately satisfy the simultaneous equations

$$\frac{1}{(n-1)}\left(\frac{\sin\ (n-1)\alpha}{\alpha}+\frac{\sin\ (n-1)\beta}{\beta}\right)=0$$

$$\frac{1}{(n+1)}\left(\frac{\sin\ (n+1)\alpha}{\alpha}+\frac{\sin\ (n+1)\beta}{\beta}\right)=0$$

where
$2\alpha$ is the angular extent in degrees of one pole,
$2\beta$ is the angular extent in degrees of the other pole, and
$n$ is the number of slots in said stator.

2. The device of claim 1 wherein said stator is provided with twelve slots.

3. The device of claim 1 wherein the angular extent of one of the rotor poles corresponds approximately to an even number of the stator slots and the angular extent of the other rotor pole corresponds approximately to an odd number of said slots.

4. The device of claim 1 wherein the angular extent of one of the rotor poles is approximately 90° and the angular extent of the other rotor pole is approximately 120°.

References Cited in the file of this patent
UNITED STATES PATENTS
2,469,190    Adamson _____ May 3, 1949

OTHER REFERENCES
Richter: R. Anker, page 232, abb. 218c. Berlin, Julius Springer, 1920, Ankerwickungen f.g.u.w.